United States Patent [19]
Braude et al.

[11] 3,753,770
[45] Aug. 21, 1973

[54] FIRE RETARDANT COMPOSITIONS CONTAINING NITROGEN-PHOSPHOROUS-HALOGEN ADDUCTS

[75] Inventors: George L. Braude; Eldon E. Stahly, both of Ellicott City, Md.

[73] Assignee: W. R. Grace & Co., Washington Research Center, Columbia, Md.

[22] Filed: Nov. 30, 1971

[21] Appl. No.: 203,420

[52] U.S. Cl......... 117/138, 117/62.1, 117/138.8 F, 117/138.8 D
[51] Int. Cl............................................. B44d 1/22
[58] Field of Search............ 117/136, 138, 138.8 F, 117/138.8 D, 138.8 A, 161 KP, 161 ZB, 106 R, 62, 62.1, 47 A; 252/8.1; 106/15 FP; 260/2.5 FP

[56] References Cited
UNITED STATES PATENTS
3,132,045   5/1964   Hill..................................... 117/138

Primary Examiner—William D. Martin
Assistant Examiner—Theodore G. Davis
Attorney—Richard P. Plunkett et al.

[57] ABSTRACT

A process of producing flame resistant layers, which comprises treating cured resins or cured formed resinous bodies with the vapor of phosphorus trichloride and thereafter subjecting the treated resins to the vapors of ammonia. Satisfactory flame resistance is given by concentrations of the halide moiety of between 5 and 20 percent by weight of the resin.

4 Claims, No Drawings

FIRE RETARDANT COMPOSITIONS CONTAINING NITROGEN-PHOSPHOROUS-HALOGEN ADDUCTS

This invention relates to compositions which, when added to polyester or epoxy resins and in special circumstances grafted onto the surface molecules of alpha-olefin shapes, give substantial fire retardancy to the entire resinous mass.

Prior art of fire retardant compositions effective in like circumstances will disclose that the reaction products of phosphorus halides and oxyhalides with ammonia and amines have been used. However, the compositions lost the halide as soon as they were combined with the resin, and thus a large portion of the potential fire retardancy of these compositions is lost at the time of the resin cure. The present compositions are distinguished from those of the prior art known to us by retaining substantially all of the halide in the mixed resin composition, and therefore the fire retardance of these compositions is materially increased.

Although about 15 weight percent of the complex will produce effective fire resistance, the effectiveness of some of these compounds is such that as little as 5 weight percent added to the resin will impart "nonburning" characteristics, conforming to ASTM standards. The compositions possess the advantage of effectiveness over long periods of time. Although, according to the prior art, considerable fire retardancy was achieved by the use of the adducts of phosphorus halides, the volatility of the useful halogen compounds was sufficient to cause the progressive loss of flame-resistant characteristics.

In contrast, in the present invention the halide moieties remain in the resin compositions. Long time combustion retardancy results.

The combination of these metal, metaloid of phosphorus halides (MX) with ammonia or amines produces the complex or coordination compounds which are added to the resin or milled into the mass preliminarily to any molding or sheeting-out operations.

In our invention, we utilize the simple adducts of phosphorus chloride ($PCl_3$ and $PCl_5$), and of nitrogen compounds such as ammonia, urea, ammonium sulfocyanide, hexamethylene tetramine, isocyanuric acid, cyanuric acid and the like. In place of phosphorus, effective adducts can also be produced using the following elements and radicals: B, Al, Sn, Ti, Si, PO, PS, Sb, SbO, V, VO, As and S. So, by our process we combine all three elements, phosphorus or its equivalents, nitrogen and halogen in compatible low-cost additives which may be incorporated in plastic bodies or in coatings for plastic and other combustible materials.

When incorporated in polyester and epoxy resins, phenolic resins, polyurethanes, novolak-epoxy resins and polystyrene, or associated with the alpha-olefins as will later appear, the halogen is not released as the resin is cured. In contrast to compounds of the prior art, the halogen contributes permanently to the fire retardancy of the composition. In a further surprising aspect of the invention, we have found that effective flameproofing treatment can be given to the mass of resin after it has been shaped or formed. It is not necessary to incorporate the fire retardant complexes in the resin prior to any molding or sheeting operation.

Surprisingly, we have found that phosphorus, metal or metaloid halides (MX) possess the ability to diffuse into the resinous mass which thereafter can be reacted with the ammonia or amine to produce, in the surface layers of the mass at least, substantial degrees of fire retardancy. Diffusion of the MX compound into the resin can take place when these compounds either are liquids or are vapors, and results in effective flame resistant resin products. The MX compound must be used in the vapor phase when the resin is soluble in the liquid. As an example of this: polystyrene dissolves in liquid $PCl_3$. Therefore, gaseous $PCl_3$ must be used to produce the desired result.

The uncured resins which are made fire resistant by this process comprise polyesters containing about 10–45 percent and preferably 20–40 percent by weight of molecular styrene or a similar ethylenically unsaturated monomer, epoxy resins, novolak epoxy resins, phenolic resins and polyurethanes. The polyester may be composed of an ester formed from a polyhydric alcohol such as ethylene glycol, diethylene glycol, propylene glycol and polyethylene glycol, having a molecular weight of between 300 and 4,000, together with phthalic acid, maleic acid, fumaric acid, itaconic acid, aconitic acid or anhydrides of the same.

The esters above identified are mixed or dispersed in, preferably, 20–50 percent by weight of ethylenically unsaturated monomer which may consist of styrene, vinyltoluene, methylstyrene, dimethylstyrene, methyl-alpha-methylstyrene, o-, m- and p-bromostyrene, dibromostyrenes, o-, m- and p-chlorostyrene, dichlorostyrenes, diallyl phthalate, vinyl acetate, methyl methacrylate, or divinylbenzene. The fire retardant salts are added to the composition in the proportion of 3–15 percent.

The uncured resins operable herein can also be epoxy resins such as the diglycidyl either of Bisphenol A (e.g. Epon 828) or a prepolymer of diglycidyl ether of Bisphenol A such as Epon 1001, 1004, 1009 and 1010, having molecular weights of 1000 to 12,000. Also operable are novolak prepolymer consisting of phenol formaldehyde condensation product of 300 to 500 molecular weight condensed with two or more molecules of epichlorohydrin; novolak polymers, i.e., low molecular weight or stage A prepolymers prepared from hydroxy aromatic compounds and formaldehyde; and polyurethane precursors consisting of polyisocyanates and compounds containing active hydrogen e.g., polyols, polyamines, polymercaptans and polycarboxy compounds.

These resins can be cured by mixing with a second component which is selected from the class of free radical initiators and "active hydrogen" compounds. The cured resins containing 3–15 weight percent of out complex fire resistant additives are fire resistant thermoset resins. Curing is effected by conventional procedures for each type of resin. The unsaturated polyester-vinyl monomer compositions are cured by maintaining at a temprature in the range of 25°–150°C for 1–24 hours after mixing with a free radical initiating catalyst, e.g., 0.2 to 1.0 weight percent azo-bis(isobutyronitrile) or 0.1 to 2.0 wt. percent of an organic peroxide such as methylethyl ketone peroxide or 2-hydroxy-2-hydroperoxypropane, or benzoyl peroxide promoted by a small amount of an amine such as from 0.1 to about 1.5% N-dimethylaniline plus 0.02 to about 3 wt. percent vanadium or cobalt added as a soluble salt such as the octoate, naphthenate, or acetylacetonate.

The epoxy resins are cured over a period of 1–100 hours at gradually increasing temperatures from 20°–200°C after admixing with a hardener in the ratio of 10–100 pts. per 100 pts. by weight of the epoxy compound. The hardeners contain two or more active H atoms and include di- and poly-amines, e.g., ethylenediamine, diethylenetriamine, triethylenetetramine, methylenedianiline, mixtures of amines such as Caytur 7 sold by DuPont (a mixture of m-phenylenediamine and cumenediamine) and dichlorobenzidine; polyols such as ethylene glycol or Bisphenol A plus a small amount of catalyst, e.g., tributylamine, N-dimethyl- or N-diethyl-aniline; polymercaptans such as ethanedithiol, tetra-ester formed from pentaerythritol and mercaptopropionic acid; anhydrides of di or polycarboxy acids. Similar mixtures of hardeners and catalyst with the novolak-epoxy compositions are cured in the temperature range of 20°–200°C over a period of 1–100 hours.

The polyurethanes can be prepared from polyisocyanates such as methylene bis-phenylisocyanate, tolylene diisocyanate, and polyisocyanates by reaction with active hydrogen-containing compounds. The polyisocyanates can be "blocked," e.g., with phenols, and if desired can be admixed with the second component of the polyurethane resin producing materials, the latter containing the complex fire retardant additives of this invention. The more common practice is to store the "non-blocked" polyisocyanates, and the second component individually and to combine them just prior to application and curing. The second component is a polyfunctional compound such as a polyol, polyamine, polythiol, etc., and can be stored for long periods of time after adding our additives. These fire retardant compositions containing from 3–15 wt. percent of our fire resistant additive together with the "blocked" polyisocyanates can be stored for equally long periods of time without change until such time as it is desired to cure them. The curing is performed as follows: the mixtures comprising polyisocyanate, second component, and our additive are heated and the blocking agent, when used, e.g., phenols, is distilled out under reduced pressure following which the system can be cured by further heating in the range of 50°–150°C for 1–24 hours.

Finally, phenolic resins containing the fire retardant additives of this invention in amounts of 3–15 wt. percent are cured by admixing with 5–10 wt. percent of hexamine (i.e., hexamethylenetetramine) and heating in the range of 20°–200°C for from 1 to about 24 hours.

The number of individual compositions which, when combined with resins impart substantial fire retardance, is quite large. All of the compounds, however, fell under the general formula:

$$[M_a X_b Z_c]_m [RNH_2]_n [A]_p.$$

In the above formula, the symbols represent the moieties listed. In the case of R and R′ both cannot be ($-NH_2$) simultaneously.

M = B, Al, Sn, Ti, Si, P, PO, PS, Sb, SbO, V, VO, As, S

X = F, Cl, Br, O, OH, N, $-NH-P(O)(Cl)NH_2$, RNH, ($-OC_6Cl_5$) (pentachlorophenoxy)

Z = $NH_2-$, R′NR—, (=NH)

R and R′ = H, $NH_2$, $-CONH_2$, Alkyl, Aryl

A = $NH_4Y$, Y=Br, —Cl, —OH, —CNO, —OCN, —SNC, —CNS a = 1 or 2 b = 2, 3, 4 or 5 c = 0, 1, 2 or 3 m = 1, 2, 3, 4 or 5 n = 0, 1–12 inclusive p = 0, 1–12 inclusive

Specific compounds are listed to exemplify types of additives of the above formula: $P(NH_2)_3 \cdot 3NH_4Cl$, $SCl_2 \cdot 4NH_3$, $S_2Cl_2 \cdot 4NH_3$, $PCl_5 \cdot 10NH_3$, $PO(NH_2)_2Cl \cdot (NH_3)_2 - (NH_4Cl)_2$, $(P_2O_5)_{10}(NH_3)_{10}$, $[P(NH_2)_3]$, $(NH_4Cl)_3$, $POCl_3 \cdot (NH_3)_6$, $PBr_3(NH_2CONH_2)_3$, $SbCl_3(NH_3)_6$, $SiCl_4(NH_3)4$, $P(O)Cl_2-NH-P(O)(Cl)-NH_2$, $PCl_3-NH_4SCN$, $PCl_2(OC_6Cl_5)-NH_4Cl$, $POCl_3(NH_2-CONH_2)_3$, $ZnCl_2(NH_3)_2$, $TiCl_4(NH_3)_4$, and others demonstrated in the following examples.

EXAMPLE I

A 3-liter, 3-neck flask was fitted with a mechanical stirrer, a through-tube and a reflux condenser, connected by means of a gas dispersion tube to a slightly acidic (yellow) bromothymol blue indicating solution. The flask was charged with 1,000 cc of dry benzene and 0.5 mol of $P_2O_5$. The reaction flask was immersed in an ice bath cooled to 10°C, and anhydrous ammonia was bubbled through the solution until it became saturated shown by the color change to blue in the indicating solution. The fine white crystalline product which resulted readily hydrolized. Its melting point was determined to be 160°C. Assuming that the water of reaction stayed with the amido phosphorous compound which formed according to the following reaction, the yield was quantitative:

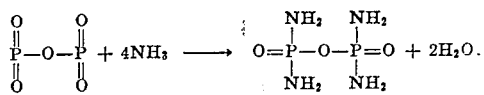

Apparently the water was retained as an hydrate. The product was obtained by filtering under suction.

9.25 parts of GR 941 (a general purpose polyester manufactured by the Marco Division, W. R. Grace & Co.) was weighed out into an aluminum pan and then 2.25 parts of the above adduct were added with vigorous stirring. This was immediately followed by the addition of 3 parts of styrene and 0.15 parts of cobalt octoate solution (12% cobalt). 0.1 part of dimethylaniline and 0.02 part of 30% $H_2O_2$ in water. In about 15 minutes, spontaneous warming began to occur. The mixture was poured into an aluminum container to make flame test samples 5 inches long and ¼ inch thick, which were allowed to stand for one hour at room temperature. The samples were then placed in an oven maintained at 70°C for one hour. The resultant well-cured resin self-extinguished in 60 seconds when tested by ASTM test D635.

EXAMPLE II

Ammonia gas was bubbled into a solution of 77.0 grams (0.5 mols) of $POCl_3$ in 2,350 grams of carbon tetrachloride. The flask was cooled in ice water to maintain the reaction temperature of the solution below 20°C. A white crystalline solid separated progressively. When 24 grams of $NH_3$ were absorbed, the ammonia feed was cut off and the product was filtered. On analysis it was found to contain 90% of $CCl_4$. The product analysis approximated that for a mixture of $NH_4Cl$ and

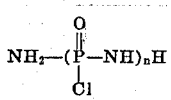

wherein $n = 2.5$. The 2.5 value was evidence of a mixture of compounds in which $n = 2$ and 3 respectively. The $NH_4Cl$ comprises about 50 percent of the mixture.

Two grams of the above was thoroughly mixed with 8.5 grams of an epoxy resin (Epon 828, Shell Chemical Co., epoxy equivalent 175–210, M.W. 350–400) and 1.0 grams of diethylenetriamine. This mixture was allowed to stand for one hour at room temperature during which time the sample hardened. Thereafter a 16-hour exposure to a temperature of 100°C followed by 8 hours at 125°C completed the curing process. Various pieces of the sample were tested for fire resistance according to ASTM burning test D635. All pieces self-extinguished themselves in 5–10 seconds.

EXAMPLE III

The procedure of Example II was followed except that 52 grams of $PCl_5$ (0.25 mols) was used instead of $POCl_3$ and it was dissolved in 392 grams of pyridine instead of carbon tetrachloride. The adduct contained 42 grams of $NH_3$. On analysis the solution was found to contain 15 percent of the adduct and 85% pyridine. 10 grams of Epon 828 epoxy resin was weighed into an aluminum pan and 5 grams of 50/50 mixture of the above adduct and styrene was mixed together. Finally 0.5 grams of diethylenetriamine, a catalyst which acted as a hardener, was stirred in. After one hour at room temperature and 18 hours during which time the temperature remained at 80°C, the temperature was raised to 125°C for 6 hours after which the sample was fully cured. When subjected to ASTM test D635, the sample self-extinguished in 45 seconds.

To save much repetition, a number of the following examples are here reported in summary form:

EXAMPLE IV $POCl_3$ –$NH_3$ adduct prepared by the procedure of Example III and containing 90% $CCl_4$ when added to epoxy resin Epon 828 at 15 weight percent and cured as in Example III, self-extinguished (SE) in 5 seconds after igniting for 30 seconds in a 1-inch Bunsen burner flame. When the concentration of the $POCl_3 \cdot 6NH_3$ adduct was reduced to 5% of the weight of the resin, self-extinguishment in the same flame test occurred in 36 seconds. The divergence from the ASTM D–635 test was simply the use of a 1-inch wide sample instead of ½-inch wide.

EXAMPLE V

When $POCl_3 \cdot NH_3$ plus an equal weight of $NH_4Cl$ was mixed with general purpose polyester resin GR 941 (Marco Division of W. R. Grace & Co.) dissolved in Xylene and later cured, self-extinguishment occurred in 52 seconds in the flame test used in Example IV. The curing was accomplished by admixing the polyester resin with 0.5 wt. percent Lupersol DSW (a solution of 60% methylethylketone peroxide) 0.5 wt. percent dimethylaniline and 0.2 wt. percent of cobalt octoate solution (12% cobalt), allowing for an initial exotherm dissipation by standing 1 hour at 25°C, then heating at 100°C for 4 hours or until the odor of styrene completely disappeared.

EXAMPLE VI

When the adduct of Example V plus an equal weight of ammonium chloride mixed in water was reacted with epoxy resin Epon 828 at 10 wt. percent and cured with 10% diethylenetriamine as in Example II, self-extinguishment occurred in 2 seconds in the flame test defined in Example IV.

EXAMPLE VII

The adduct of phosphorus oxychloride and urea formed in carbon tetrachloride solution contained 5% $CCl_4$ and added to epoxy resin Epon 828 in 10 wt. percent concentration and cured as in Example II, did not ignite in the modified ASTM D635 test used in Example IV.

EXAMPLE VIII

When 15 wt. percent of $P_2O_5 \cdot NH_3$ product was mixed with polyester GR 941 (above identified) and cured as in Example I, self-extinguishment occurred in 55 seconds after the 30 seconds ignition test of Example IV.

EXAMPLE IX

When 1 mole of phosphorus trichloride, 1 mole of urea and 1 mole of pentachlorophenol were reacted together and the adduct added to polyester GR 941 and cured as in Example I, self-extinguishment occurred in 30 seconds in the flame test ASTM D–635. The reaction with pentachlorophenol increases the compatibility of the adduct with the resin.

EXAMPLE X

The adduct of phosphorus pentachloride and ammonia (10:1 mole ratio) was reacted in styrene and added at 17 wt. percent concentration to GR 941 polyester resin, which then was cured as in Example V, the cured resin self-extinguished in 5 seconds in the flame test described in Example IV.

EXAMPLE XI

The adduct of phosphorus oxychloride 4.5 parts and urea 5.5 parts mixed with 5% $CCl_4$ was mixed with 8 parts of epoxy resin Epon 828 and cured by the schedule given after Example XVIII. It self-extinguished in 14 seconds in the flame test of Example IV. When the respective weights were changed to 3.3 for phosphorus oxychloride, 4 for urea and 7.3 for the epoxy resin, the state of cure was excellent and self-extinguishment occurred in one second.

EXAMPLE XII

The adduct of zinc chloride and ammonia reacted in acetone and added to polyester GR 941 at 10 wt. percent, and cured as in Example V, self-extinguished in 20 seconds in the flame test of Example IV.

EXAMPLE XIII

When 15 wt. percent of the adduct of Example XII was added to epoxy resin Epon 828 and cured by the schedule cited below, the cured resin self-extinguished in 30 seconds in the flame test described in Example IV.

EXAMPLE XIV

When vanadium oxychloride was reacted with ammonia in carbon tetrachloride solution and 15 wt. percent of the partially dried product containing about 15% $CCl_4$ was added to polyester GR 941 and the mixture was then cured as in Example V, the cured resin self-extinguished in 36 seconds in the flame test of Example IV.

EXAMPLE XV

When 15 wt. percent of the vanadium oxychloride-ammonia adduct of Example XIV was added to epoxy resin Epon 828 and cured as described hereinafter, self-extinguishment occurred in 31 seconds in the flame test of Example IV.

EXAMPLE XVI

Antimony trichloride in carbon tetrachloride solution was reacted with ammonia and 15 wt. percent of the adduct (including 85% $CCl_4$) was added to epoxy resin Epon 828 and cured as described after Example XVIII, the flame test of Example IV gave self-extinguishment in 3 seconds.

EXAMPLE XVII

When 15 wt. percent of the antimony adduct of Example XVI was added to polyester GR 941 and cured as in Example V, ASTM D 635 resulted in self-extinguishment in 50 seconds.

EXAMPLE XVIII

The adduct of titanium chloride and ammonia reacted in carbon tetrachloride and containing 25% $CCl_4$ solvent was added in 15 wt. percent concentration to epoxy resin Epon 828 and cured. The cured resin self-extinguished in 39 seconds.

In Examples VIII to XVIII inclusive, the $(M_aX_b)_m \cdot (RNH_2)_n$ preparation and the polyester resin cures were conducted in the following manner:

The adduct was prepared by a process analogous to the adduct preparation in Example II, i.e., the ingredients were placed in an excess of the solvent noted (carbon tetrachloride, acetone, styrene). The flask was cooled in ice water to keep the reaction temperature below 20°C, and at the end of the reaction, the crystalline solid adduct was filtered from the solution. In Example VIII, 2.5 parts of the filtered adduct were ground with 4.3 parts of styrene and then the slurry was stirred into 7.85 parts of polyester resin GR 941. In Examples IX, X, XII, XIV and XVII, the styrene was omitted. Thereafter, 0.2 parts of cobalt octoate solution containing 12% cobalt, 0.1 part of N-dimethylaniline and 0.05 parts of 30% hydrogen peroxide were mixed into the polyester. The resin began to cure immediately at room temperature and heated spontaneously to over 60°C in 10 minutes. The resin was poured into sample molds and placed in an oven at 65°C for 18 hours, followed by a bake at 100°C for 2 hours.

The epoxy resins in the above examples, XI, XIII, XV, XVI and XVIII, were cured as follows: 75 parts of epoxy resin Epon 828 mixed with 4.5 parts of diethylenetriamine. The resin was poured into sample molds, allowed to stand 1 hour and placed in an 80° oven for 4 hours, then placed in a 100°C oven for 4 hours and finally in an oven at 125°C for 16 hours.

As has been stated, it is not necessary for the resin to be in uncured form or dissolved in order for the reaction with the adducts to occur. The following example shows how an effective surface treatment adding materially to the fire resistance of a resinous mass can be prepared after that mass has been given its form as, e.g., by molding.

EXAMPLE XIX

Ten parts by weight of the additive of Example XI were admixed with 90 parts of phenolic-epoxy resin D.E.N. 431. The mixture was charged to an ashtray mold and cured with 10 parts diethylenetriamine using the heating schedule described above for Examples XI, XIII, XV, XVI and XVIII. The cured ashtray was nonburning and self-extinguished immediately in the flame test described in Example IV.

EXAMPLE XX

Example XIX was repeated but substituting 90 g. of BMG 5120 (phenolic molding compound sold by Union Carbide Corp.) in the place of D.E.N. 431. After heating at 160°C. and 2,000 psig pressure for 5 minutes, the "cured" ashtray was removed from the mold and tested as in Example XIX, the tray was immediately self-extinguished.

EXAMPLE XXI 60 parts of polyester resin GR 941 was thoroughly mixed with 0.4 parts of Lupersol DSW (methyl ethyl Ketone peroxide) and then 0.2 parts of cobalt octoate was added. The mixture was poured into resin molds which were placed in an oven maintained at 80°C for 64 hours. All samples showed excellent cures. The samples were removed and placed in a vessel where they were treated for 2 hours with the vapor of phosphorus trichloride which saturated the atmosphere in the vessel, and at the end of this time the samples were treated for a further period of 2 hours with ammonia vapor. When these samples were subjected to the tests for flame resistance ASTM D–635, the treated resin samples self-extinguished in 45 seconds.

Accordingly, any formed shape can be given a treatment which penetrates at least the surface layers of the resin and confers very effective flame-proofing to the resinous mass.

EXAMPLE XXII

Polystyrene foam was prepared by steamheating expandible styrene beads (from Koppers Co.) which, prior to expansion, were treated with $PCl_3$ and $NH_3$ vapor as in Example XV. The resultant foam melted but would not burn in the ASTM test for foams.

EXAMPLE XXIII (Fire retardant resins formed by the in situ method)
Rigid polyurethane samples were prepared by curing a polyisocyanate sold by the Upjohn Company and reported to be a mixture of:

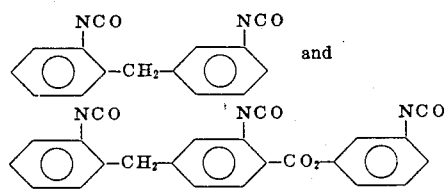

with tetramercaptan. The tetra ester was prepared by esterifying pentaerythrithol with beta-mercapto propionic acid. Equal weights of the polyisocyanate and the tetramercaptan were thoroughly blended, warmed and evacuated in a vacuum chamber until all dissolved volatiles were removed. This was indicated by the cessation of bubbling and required about ½ hour. The resin was poured into sample molds which were placed in an 80°C oven for 64 hours to develop hard cures. When cured, the samples were subjected to PCl$_3$ vapor for about 2 hours; and following this, ammonia vapor was admitted to the chamber and maintained for about 3 hours. The adduct formed on the surface and penetrated the surface layers of the resin. When these samples were tested, they self-extinguished in 3 seconds or less.

EXAMPLE XXIV 75 gr. of an epoxy resin, Epon 828, was mixed with 4.5 gr. of diethylenetriamine and poured into sample molds. After an hour at room temperature, the molds were placed in an 80°C oven for an hour and then heated to 125°C for 16 hours. Thereafter the samples were transferred to a vessel which was filled with the vapor of phosphorus trichloride. Treatment continued for 2 hours. Following this, ammonia gas was admitted to the chamber for 2 hours. All samples self-extinguished in 45 seconds or less when tested according to ASTM-D-635.

EXAMPLE XXV 60 gr. of GR 941 polyester general purpose resin, Marco Division, W. R. Grace & Co., was thoroughly mixed with 0.4 gr. of Lupersol DSW methylethyl ketone peroxide (60 percent solution). Then 0.2sgr. of cobalt octoate was added. After a few minutes the resin was poured into sample molds which were placed in an 80°C oven for an hour, then at 100°C for 7 hours. Very good cures resulted. The resin samples were then treated successively with phosphorus trichloride vapor and ammonia vapor as described in Example XXI. These samples were tested according to ASTM D-635 procedure. The samples self-extinguished in 2 seconds or less.

Where self-extinguishment is used in the examples and specifications herein, it is defined as "self-extinguished" after ignition for 30 seconds in a Bunsen burner flame from 1 to 1.5 inches high, either according to D-635 (sample size ¼ × ½ × 5 inches), of by modified D-635 wherein the only difference is in sample size (¼ × 1 × 5 inches).

EXAMPLE XXVI

An epoxy resin mixture consisting of 92 parts Epon 828 and 8 parts of allylglycidyl ether was cured by admixing with 10 parts triethylenetetramine and, after an hour at room temperature, was placed in an oven at 50°C, and the temperature of the oven was gradually increased to 125°C over a 4 hour period. It was then left at 125°C for 16 hours to give a cured resin having a hardness of Shore D 92. The cured resin was exposed to PCl$_3$ vapors for an hour followd by ammonia vapors for an hour. This resin would not ignite in less than 30 seconds, and when finally ignited, it self-extinguished in less than 5 seconds. This example demonstrates the incorporation of an alpha-olefinic monomer (i.e., allylglycidyl ether) in the resin matrix, subsequent addition of PCl$_3$ to the olefin group, followed by addition of ammonia to the —PCl$_2$ moiety, and thus fireproofing the surface of the resin. The overall chemical reactions may be represented as follows:

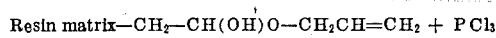

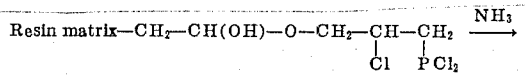

What is claimed is:

1. The process of preparing flame resistant resins which consists of subjecting cured resins of the class consisting of cured polyurethane resins, cured polyester resins, cured polystyrene resins, cured epoxy resins to the vapor of phosphorus trichloride and subsequently immediately subjecting the PCl$_3$ treated resin to the vapors of ammonia for a period of about 2 hours whereby the resin has a halide moiety concentration of 5-20 percent by weight of the resin.

2. The process of producing a flame resistant layer at and adjacent to the surface of a formed resinous body which consists in treating a formed resinous body selected from the class of cured formed polyester bodies, cured formed epoxy resinous bodies, cured formed polyurethane bodies and cured formed polystyrene bodies to the vapors of phosphorus trichloride for a period of about 2 hours, withdrawing the phosphorus trichloride vapor and then subjecting the treated resinous body to the vapors of ammonia for a period of about 2 hours whereby a flame resistant layer comprising the resin and -5–20 percent of the resin of the adduct of phosphorus trichloride and ammonia is formed on the surface of the body.

3. The cured resin product of claim 1.

4. The cured resin product of claim 2.

* * * * *